(12) United States Patent
Noguchi et al.

(10) Patent No.: US 11,628,691 B2
(45) Date of Patent: Apr. 18, 2023

(54) TIRE

(71) Applicant: SUMITOMO RUBBER INDUSTRIES, LTD., Hyogo (JP)

(72) Inventors: Takafumi Noguchi, Hyogo (JP); Yoshiaki Kanematsu, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 203 days.

(21) Appl. No.: 17/094,167

(22) Filed: Nov. 10, 2020

(65) Prior Publication Data
US 2021/0155056 A1     May 27, 2021

(30) Foreign Application Priority Data
Nov. 25, 2019   (JP) .............................. JP2019-212400

(51) Int. Cl.
*B60C 13/00* (2006.01)
*B60C 13/02* (2006.01)

(52) U.S. Cl.
CPC ............ *B60C 13/001* (2013.01); *B60C 13/02* (2013.01)

(58) Field of Classification Search
CPC ............................... B60C 13/02; B60C 13/001
See application file for complete search history.

(56) References Cited

U.S. PATENT DOCUMENTS

| 2012/0318423 | A1* | 12/2012 | Yamakawa | ............ B60C 13/001 152/523 |
| 2014/0326385 | A1* | 11/2014 | Sato | ....................... B60C 13/001 152/523 |
| 2021/0039449 | A1* | 2/2021 | Sato | ....................... B60C 13/001 |

FOREIGN PATENT DOCUMENTS

| EP | 2781376 | 9/2014 |
| JP | 2014-136487 | 7/2014 |
| JP | 2014180946 | 9/2014 |

OTHER PUBLICATIONS

Extended European Search Report in family member EP patent application No. 20204372.5 dated Feb. 16, 2021.

* cited by examiner

*Primary Examiner* — Katelyn W Smith
*Assistant Examiner* — Brendon Charles Darby
(74) *Attorney, Agent, or Firm* — Greenblum & Bernstein, P.L.C.

(57) ABSTRACT

A tire includes a pattern portion on a surface of a sidewall portion. The pattern portion includes an outer pattern and an inner pattern. The outer pattern includes a plurality of outer ridges disposed concentrically around a first point on a tire circumferential line on an outer side in a tire radial direction and extending toward a second point, on the tire circumferential line, which is different from the first point. The inner pattern includes a plurality of inner ridges disposed concentrically around the second point on an inner side in the tire radial direction and extending toward the first point. Each of the outer ridges connects with one of the inner ridges on the tire circumferential line.

20 Claims, 10 Drawing Sheets

TIRE

BACKGROUND OF THE INVENTION

Field of the Invention

The present invention relates to a tire.

Description of the Background Art

Japanese Laid-Open Patent Publication No. 2014-136487 discloses a pneumatic tire having a serial decorative pattern formed on a surface of a sidewall portion. The decorative pattern has unit patterns repeatedly aligned. In the unit pattern, a plurality of substantially polygonal patterns having analogous shapes are disposed around the same center.

The decorative pattern described above has, for example, an effect (hereinafter, may be referred to as "camouflaging effect") of camouflaging, by utilizing contrast of light, molding defects appearing as projections and recesses such as bulges and dents which tend to be generated on the surface of the sidewall portion, so that the outer appearance of the sidewall portion is improved.

In recent years, the outer appearance of the sidewall portion is required to be further improved by making such a decorative pattern conspicuous.

The present invention has been made in view of the aforementioned circumstances, and a main object of the present invention is to provide a tire that allows the outer appearance to be improved.

SUMMARY OF THE INVENTION

The present invention is directed to a tire including a sidewall portion. The sidewall portion has a pattern portion on a surface. The pattern portion includes an outer pattern formed outwardly of a tire circumferential line passing through the pattern portion, and an inner pattern formed inwardly of the tire circumferential line. The outer pattern includes a plurality of outer ridges disposed concentrically around a first point on the tire circumferential line on an outer side in a tire radial direction and extending toward a second point, on the tire circumferential line, which is different from the first point. The inner pattern includes a plurality of inner ridges disposed concentrically around the second point on an inner side in the tire radial direction and extending toward the first point. Each of the outer ridges connects with one of the inner ridges on the tire circumferential line.

In the tire of the present invention, the outer ridges preferably have analogous shapes and the inner ridges preferably have analogous shapes.

In the tire of the present invention, each of the outer ridges and each of the inner ridges are preferably bent.

In the tire of the present invention, each of the outer ridges and each of the inner ridges preferably extend so as to be arc-shaped.

In the tire of the present invention, the tire circumferential line preferably passes through positions distant from an intermediate position of the pattern portion in the tire radial direction by 10% or less of a tire-radial length of the pattern portion in a tire radially inward or outward direction.

In the tire of the present invention, the tire circumferential line preferably passes through the intermediate position of the pattern portion in the tire radial direction.

In the tire of the present invention, the outer ridges adjacent to each other in a tire circumferential direction are preferably disposed at regular pitches and the inner ridges adjacent to each other in the tire circumferential direction are preferably disposed at regular pitches.

In the tire of the present invention, the pattern portion preferably includes a plurality of pattern portions aligned in a tire circumferential direction.

In the tire of the present invention, the pattern portions are preferably aligned through a gap having no ridge.

In the tire of the present invention, a width of the gap is preferably 0.5 to 3 times a pitch between the outer ridges.

In the tire of the present invention, the pattern portions are preferably disposed at regular pitches in the tire circumferential direction.

In the tire of the present invention, the pattern portions are preferably disposed at different pitches in the tire circumferential direction.

In the tire of the present invention, the outer ridges preferably include an outer maximum ridge having a greatest length. When the outer pattern has an imaginary outer line having a shape analogous to a shape of each outer ridge in a portion farther from the first point than the outer maximum ridge is, the outer ridges of another outer pattern disposed adjacent to the outer pattern on the imaginary outer line side preferably extend to and terminate on the imaginary outer line.

In the tire of the present invention, the inner ridges preferably include an inner maximum ridge having a greatest length. When the inner pattern has an imaginary inner line having a shape analogous to a shape of each inner ridge in a portion farther from the second point than the inner maximum ridge is, the inner ridges of another inner pattern disposed adjacent to the inner pattern on the imaginary inner line side preferably extend to and terminate on the imaginary inner line.

In the tire of the present invention, a total length La of a length of each inner ridge and a length of one of the outer ridges connecting with said each inner ridge is preferably 0.9 to 1.1 times a total length Lb of a length of one of the inner ridges adjacent to said each inner ridge and a length of one of the outer ridges connecting with the one of the inner ridges adjacent to said each inner ridge.

The tire of the present invention has the pattern portion including the outer pattern and the inner pattern on the surface of the sidewall portion. The outer pattern includes a plurality of outer ridges that are disposed concentrically around the first point on the tire circumferential line and that extend toward the second point on the tire circumferential line. The inner pattern includes a plurality of inner ridges that are disposed concentrically around the second point on the inner side in the tire radial direction and that extend toward the first point. Thus, the outer ridges are concentrically disposed and the inner ridges are concentrically disposed to enhance a stereoscopic visual effect, so that the pattern portion is likely to become conspicuous. The outer ridges and the inner ridges are arranged in opposite directions, so that the pattern portion has variation and contrast is enhanced. Thus, molding defects generated as recesses and projections are made inconspicuous by the outer pattern or the inner pattern.

Each of the outer ridges connects with one of the inner ridges on the tire circumferential line. Thus, molding defects generated between the outer pattern and the inner pattern can be made more inconspicuous. Furthermore, the pattern portion is made conspicuous and enhances visibility. Therefore, the tire of the present invention has an excellent outer appearance.

DESCRIPTION OF THE PREFERRED EMBODIMENTS

One embodiment of the present invention will be described below with reference to the drawings.

Figure 1:
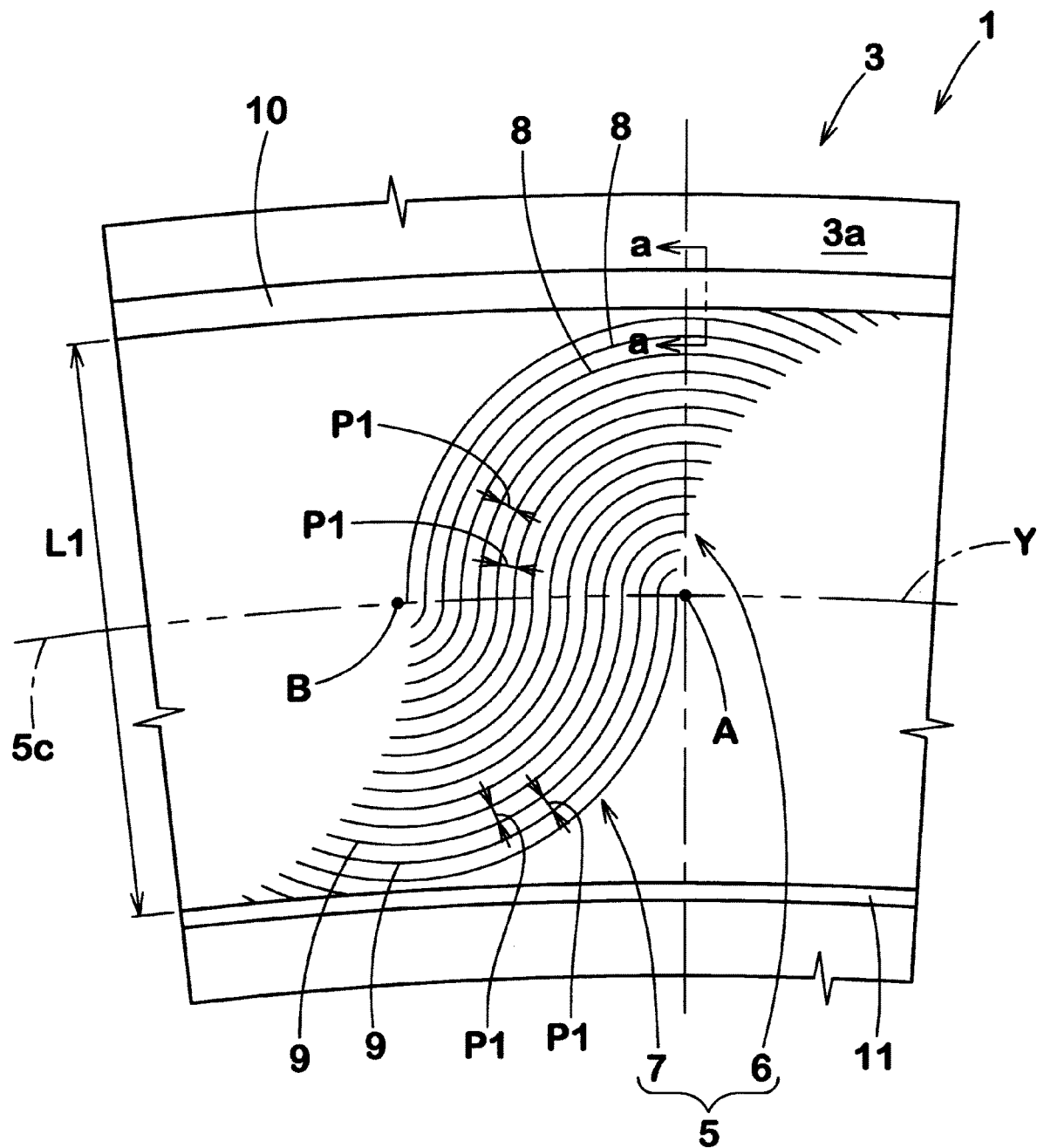
FIG. 1 is a partial side view of a tire according to one embodiment of the present invention.

FIG. 1 is a partial side view of a tire 1 of the present embodiment. FIG. 1 shows a pneumatic tire 1 for a passenger car as a preferred embodiment. The present invention is also applicable to a motorcycle pneumatic tire 1, a heavy-duty pneumatic tire 1, and the tire 1 in other categories.

As shown in FIG. 1, the tire 1 of the present embodiment has a pattern portion 5 on a surface 3a of a sidewall portion 3. The pattern portion 5 may be also formed, for example, on a surface of the sidewall portion on the other side which is not shown. In the present embodiment, the pattern portion 5 extends also on the maximum tire width position (not shown). In the description herein, the "maximum tire width position" is defined by a tire cross-sectional contour (not shown) that does not include characters on the sidewall portion 3, the pattern portion 5, a rim protector, and the like in a normal state. The upper side in FIG. 1 indicates the outer side in the tire radial direction, and the lower side in FIG. 1 indicates the inner side in the tire radial direction.

The "normal state" represents a state where the tire 1 is mounted on a normal rim (not shown) and is inflated to a normal internal pressure, and no load is applied to the tire 1. In the description herein, unless otherwise specified, the dimensions of each component of the tire 1 are indicated as values measured in the normal state.

The "normal rim" represents a rim that is defined by a standard, in a standard system including the standard with which the tire complies, for each tire, and is, for example, the "standard rim" in the JATMA standard, the "Design Rim" in the TRA standard, or the "Measuring Rim" in the ETRTO standard.

The "normal internal pressure" represents an air pressure that is defined by a standard, in a standard system including the standard with which the tire complies, for each tire, and is, for example, the "maximum air pressure" in the JATMA standard, the maximum value recited in the table "TIRE LOAD LIMITS AT VARIOUS COLD INFLATION PRESSURES" in the TRA standard, or the "INFLATION PRESSURE" in the ETRTO standard.

The pattern portion 5 includes an outer pattern 6 formed outwardly of a tire circumferential line Y passing through the pattern portion 5, and an inner pattern 7 formed inwardly of the tire circumferential line Y. In the description herein, the tire circumferential line Y is an imaginary line that extends on the surface 3a of the sidewall portion 3 in the tire circumferential direction.

The outer pattern 6 includes a plurality of outer ridges 8 that are disposed concentrically around a first point A on the tire circumferential line Y on the outer side in the tire radial direction and that extend toward a second point B (left side in FIG. 1), on the tire circumferential line Y, which is different from the first point A. The inner pattern 7 includes a plurality of inner ridges 9 that are disposed concentrically around the second point B on the inner side in the tire radial direction and that extend toward the first point A (right side in FIG. 1). Thus, the outer ridges 8 are concentrically disposed and the inner ridges 9 are concentrically disposed to enhance a stereoscopic visual effect, so that the pattern portion 5 is likely to become conspicuous. The outer ridges 8 and the inner ridges 9 are arranged in opposite directions, so that the pattern portion 5 has variation and contrast is enhanced. Thus, molding defects generated as recesses and projections are made inconspicuous by the outer pattern 6 or the inner pattern 7. In the description herein, "concentrically" includes not only a manner in which the ridges are disposed strictly around the identical center, but also a manner in which the ridges are perceived to be disposed concentrically at a glance when the tire 1 is observed with the naked eye from the outside. The first point A and the second point B are imaginary points on the tire circumferential line Y.

Each of the outer ridges 8 connects with one of the inner ridges 9 on the tire circumferential line Y. Thus, molding defects generated between the outer pattern 6 and the inner pattern 7 can be made inconspicuous. The visibility and appearance of the pattern portion 5 are improved. Therefore, the sidewall portion 3 of the present embodiment has an excellent outer appearance.

In the present embodiment, the sidewall portion 3 has an outer rib 10 disposed outwardly of the pattern portion 5 in the tire radial direction so as to extend in the tire circumferential direction, and an inner rib 11 disposed inwardly of the pattern portion 5 in the tire radial direction so as to extend in the tire circumferential direction. In the description herein, each of the ribs 10 and 11 is a projection that projects outwardly from the surface 3a of the sidewall portion 3 in the tire axial direction and continuously extends in the tire circumferential direction over one circumference.

The pattern portion 5 is formed by, for example, vulcanization molding or cutting. In the present embodiment, the pattern portion 5 is formed by vulcanization molding from the viewpoint of durability and productivity.

Figure 2:
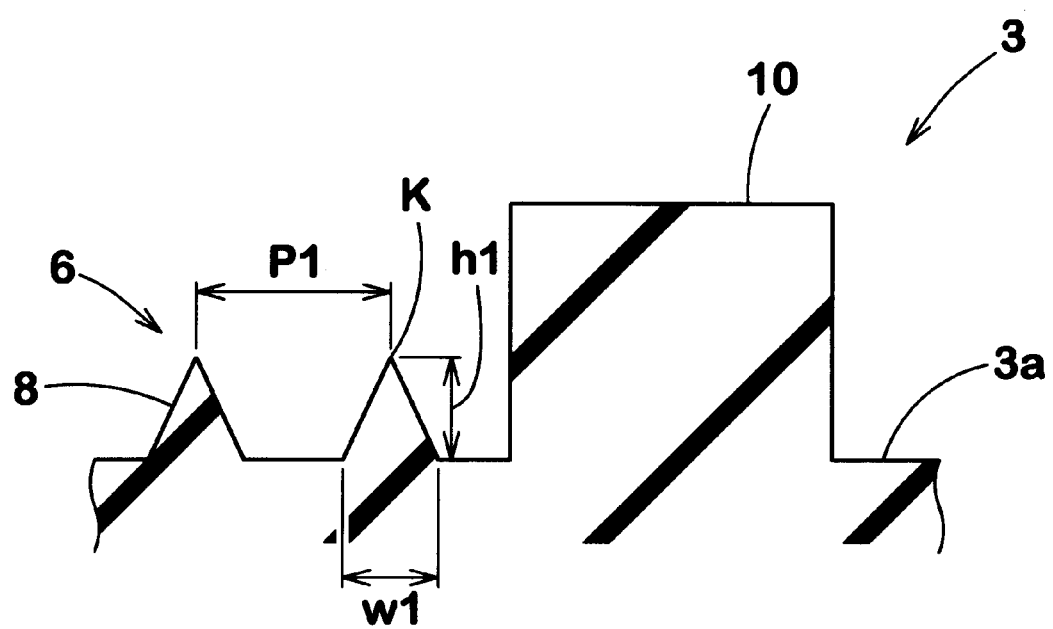
FIG. 2 is a cross-sectional view taken along a line a-a in FIG. 1.

FIG. 2 shows a cross-section taken along a line a-a in FIG. 1. As represented by the outer ridge 8 in FIG. 2, each of the outer ridge 8 and the inner ridge 9 is formed as, for example, a projection that projects outwardly from the surface 3a of the sidewall portion 3 in the tire axial direction. The cross-sectional shape of each of the outer ridge 8 and the inner ridge 9 is triangular in the present embodiment. The outer ridges 8 and the inner ridges 9 are formed to have, for example, the same cross-sectional shape. The cross-sectional shape of each of the outer ridge 8 and the inner ridge 9 may be, for example, rectangular or semicircular. In the side view (front view of the sidewall portion 3) of the tire 1 as shown in FIG. 1 or the like, a top K of each of the outer ridge 8 and the inner ridge 9 is shown.

In the outer ridge 8 and the inner ridge 9 having such structures, a width w1 orthogonal to the longitudinal direction is preferably 0.4 to 2.0 mm A projecting height h1 from the surface 3a is preferably 0.4 to 2.0 mm in each of the outer ridge 8 and the inner ridge 9.

As shown in FIG. 1, the outer ridges 8 have analogous shapes and the inner ridges 9 have analogous shapes in the present embodiment. Thus, the outer pattern 6 and the inner pattern 7 enhance visibility to improve the outer appearance. In the description herein, the analogous shape represents a shape formed in a manner where one line segment formed by the top K of the outer ridge 8 or the inner ridge 9 is enlarged or made smaller around the point A or B to completely overlap another line segment formed by the top K of the outer ridge 8 or the inner ridge 9. In the description herein, the analogous shape also represents a shape formed in a manner where, in a case where the one line segment having been enlarged or made smaller overlaps said another line segment, one of the line segments is covered with the other of the line segments. In the description herein, the analogous shape includes a shape that is perceived to be analogous at a glance when the tire 1 is observed with the naked eye from the outside. Typically, the surface 3a of the sidewall portion 3 is a three-dimensional smooth projecting curved surface. Therefore, it is difficult to form patterns having strictly analogous shapes.

For example, each of the outer ridges 8 and each of the inner ridges 9 extend so as to be arc-shaped. Thus, the outer ridge 8 and the inner ridge 9 connecting with this outer ridge form two arc-shaped parts projecting in the tire-radially opposite directions. In the present embodiment, the outer pattern 6 and the inner pattern 7 are each sector-shaped. The outer pattern 6 and the inner pattern 7 having such structures allow visibility to be enhanced and become conspicuous, thereby improving the outer appearance. In the present embodiment, the outer ridges 8 form arc-shapes having a single curvature radius, and the inner ridges 9 form arc-shapes having a single curvature radius.

In the present embodiment, the tire circumferential line Y passes through positions distant from an intermediate position 5c of the pattern portion 5 in the tire radial direction by 10% or less of a tire-radial length L1 of the pattern portion 5 in the tire radially inward or outward direction. Thus, the outer pattern 6 and the inner pattern 7 have almost the same sizes (areas), and balance in appearance of the pattern portion 5 is enhanced, to improve the outer appearance. From such a viewpoint, the tire circumferential line Y preferably passes on the intermediate position 5c of the pattern portion 5 in the tire radial direction.

In the present embodiment, the outer ridges 8 adjacent to each other in the tire circumferential direction are arranged at regular pitches P1 and the inner ridges 9 adjacent to each other in the tire circumferential direction are arranged at regular pitches P1. Thus, the contrast generated by reflection of light in the pattern portion 5 is continuous with the same ratio, thereby enhancing the camouflaging effect. In the present embodiment, all the pitches P1 of the outer ridges 8 and all the pitches P1 of the inner ridges 9 are the same in a portion from the first point A to the second point B.

For example, each of the outer ridges 8 and a corresponding one of the inner ridges 9 smoothly connect with each other on the tire circumferential line Y in the tire radial direction. Thus, the outer ridges 8 and the inner ridges 9 assuredly have stiffness, and occurrence of cracks, defects or the like are inhibited, thereby maintaining an excellent outer appearance. In the present embodiment, each of the outer ridges 8 and a corresponding one of the inner ridges 9 connect with each other so as to have an inflection point on the tire circumferential line Y.

Figure 3:
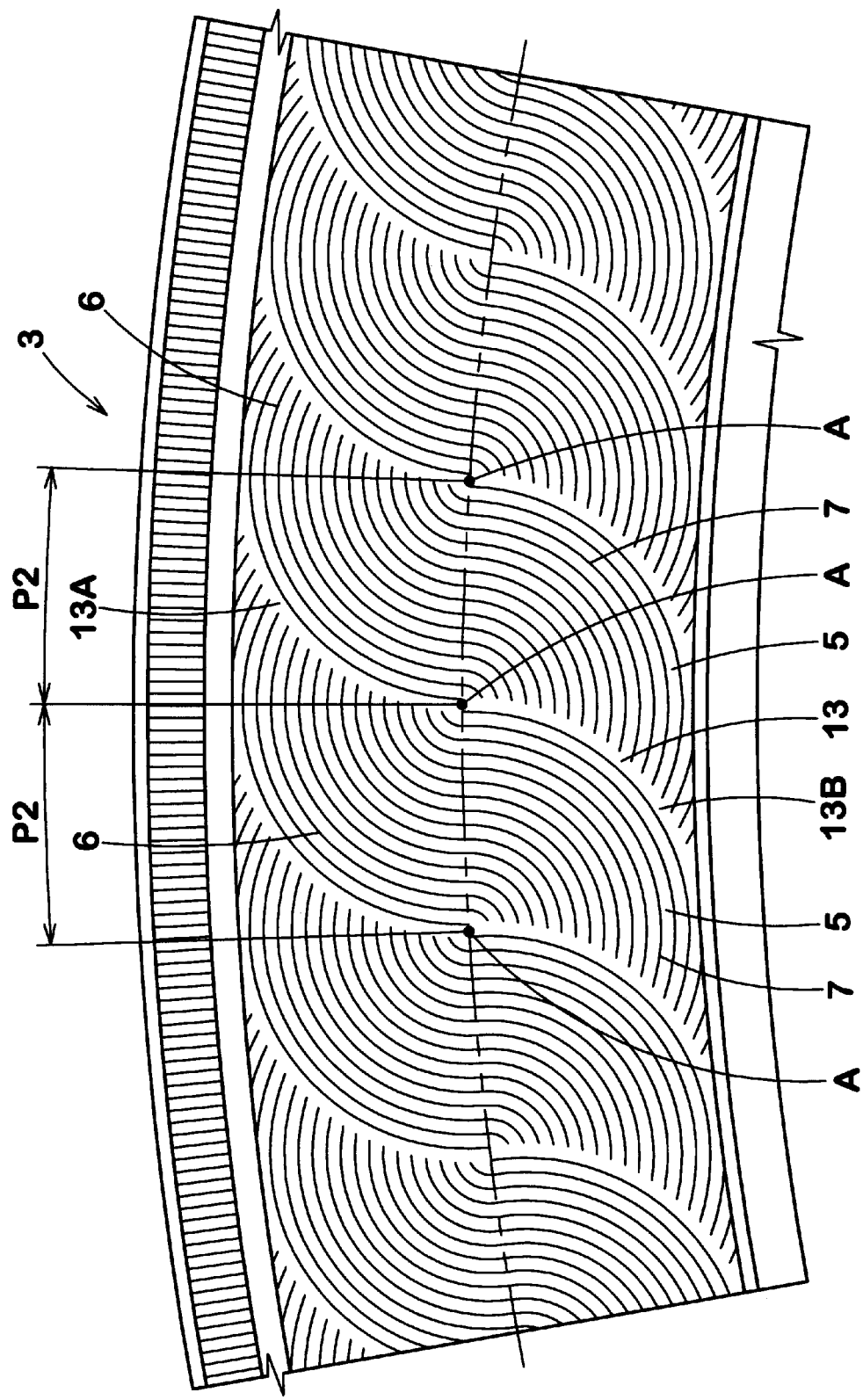
FIG. 3 is a partial front view of a sidewall portion according to the present embodiment.

FIG. 3 is an enlarged view of the sidewall portion 3. As shown in FIG. 3, for example, a plurality of the pattern portions 5 are aligned in the tire circumferential direction. For example, the pattern portion 5 may be continuously formed over one circumference in the tire circumferential direction, or may be discontinuous so as to have both ends in the tire circumferential direction.

In the present embodiment, the pattern portions 5 are aligned at regular pitches P2 in the tire circumferential direction. The pattern portion 5 having such a structure allows a viewer to feel that the arrangement is neat, thereby enhancing the outer appearance. The pitch P2 is a distance between the first points A.

The pattern portions 5 are aligned via gaps 13 having no ridges. The gap 13 having such a structure allows the pattern portion 5 to enhance visibility and become conspicuous. In the present embodiment, each gap 13 includes an outer gap part 13A formed between the outer patterns 6 adjacent to each other in the tire circumferential direction, and an inner gap part 13B formed between the inner patterns 7 adjacent to each other in the tire circumferential direction.

Figure 4:
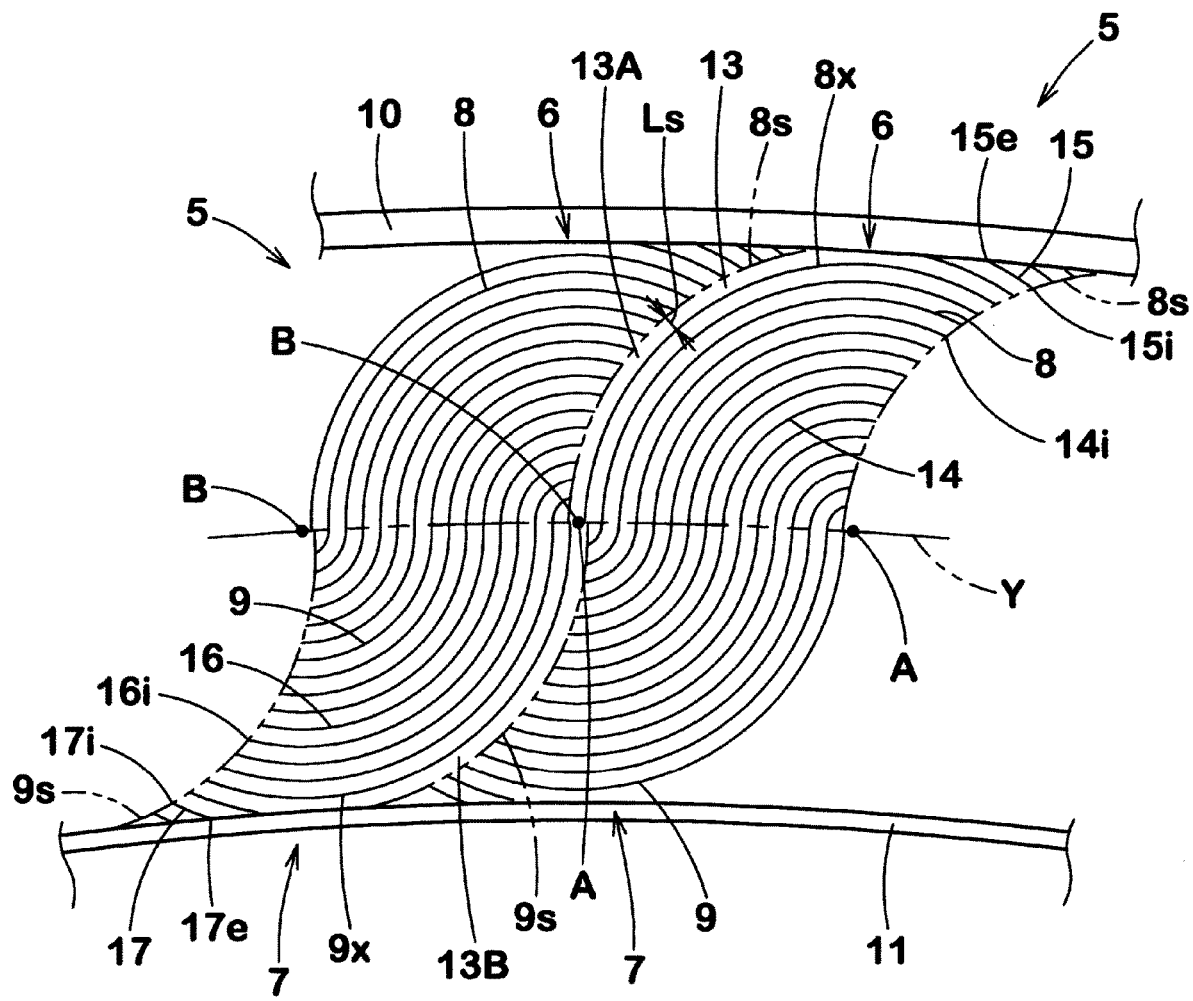
FIG. 4 is a partially enlarged view of FIG. 3.

FIG. 4 is an enlarged view of the pattern portion 5 shown in FIG. 3. FIG. 4 shows two pattern portions 5 aligned in the tire circumferential direction for convenience sake. As shown in FIG. 4, the outer ridge 8 includes, for example, an outer maximum ridge $8x$ having the greatest length. The inner ridge 9 includes, for example, an inner maximum ridge $9x$ having the greatest length.

In the present embodiment, the outer maximum ridge $8x$ is disposed so as not to be in contact with the outer rib 10. The outer maximum ridge $8x$ terminates, for example, on the tire circumferential line Y so as not to connect with the inner ridge 9. In the present embodiment, the outer maximum ridge $8x$ is disposed between the second point B and the first point A. In the present embodiment, the inner maximum ridge $9x$ is disposed so as not to be in contact with the inner rib 11. The inner maximum ridge $9x$ terminates, for example, on the tire circumferential line Y so as not to connect with the outer ridge 8. In the present embodiment, the inner maximum ridge $9x$ is disposed between the first point A and the second point B.

The outer pattern 6 includes an imaginary outer line $8s$ having a shape analogous to that of the outer ridge 8, in a portion farther from the first point A than the outer maximum ridge $8x$ is. In this case, the outer ridge 8 of another outer pattern 6 disposed adjacent to the above-described outer pattern 6 on the imaginary outer line $8s$ side, extends to and terminates on the imaginary outer line $8s$ in the present embodiment. The outer pattern 6 having such a structure improves the outer appearance of the sidewall portion 3. In the present embodiment, all the outer ridges 8 of the outer pattern 6 extend to and terminate on the imaginary outer line $8s$.

The inner pattern 7 includes an imaginary inner line $9s$ having a shape analogous to that of the inner ridge 9, in a portion farther from the second point B than the inner maximum ridge $9x$ is. In this case, the inner ridge 9 of another inner pattern 7 disposed adjacent to the above-described inner pattern 7 on the imaginary inner line $9s$ side, extends to and terminates on the imaginary inner line $9s$ in the present embodiment. The inner pattern 7 having such a structure improves the outer appearance of the sidewall portion 3. In the present embodiment, all the inner ridges 9 of the inner pattern 7 extend to and terminate on the imaginary inner line $9s$.

In the present embodiment, the first point A around which the outer pattern 6 is formed forms the second point B around which the inner pattern 7 facing the outer pattern 6 through the first point A is formed. In other words, in the present embodiment, the second point B around which the inner pattern 7 is formed forms the first point A around which the outer pattern 6 facing the inner pattern 7 through the second point B is formed. In the present embodiment, the first points A are disposed at regular pitches P2 in the tire circumferential direction. Each second point B is disposed on the first point A in the present embodiment.

As shown in FIG. 3, in the pattern portion 5 having such a structure, the outer patterns 6 are aligned in the tire circumferential direction such that a plurality of semicircles overlap at one side portions in the tire circumferential direction (in FIG. 3, the right-side semicircles are overlaid on the left-side semicircles), and appear like a relief, so that a stereoscopic visual effect is exhibited. Similarly, the inner patterns 7 are aligned in the tire circumferential direction such that a plurality of semicircles overlap at the other side portions in the tire circumferential direction (in FIG. 3, the left-side semicircles are overlaid on the right-side semicircles), and appear like a relief, so that a stereoscopic visual effect is exhibited. By the outer pattern 6 and the inner pattern 7 disposed around the first point A for this outer pattern 6, the circles shaped so as to overlap each other in the tire circumferential direction are imagined. Thus, the outer appearance of the pattern portion 5 is improved.

As shown in FIG. 4, in the present embodiment, the outer gap part 13A is formed between the outer maximum ridge 8x and the outer pattern 6 disposed on the outer maximum ridge 8x side. In other words, the outer gap part 13A is formed between the outer maximum ridge 8x and the imaginary outer line 8s. In the present embodiment, the inner gap part 13B is formed between the inner maximum ridge 9x and the inner pattern 7 disposed on the inner maximum ridge 9x side. Similarly, the inner gap part 13B is formed between the inner maximum ridge 9x and the imaginary inner line 9s.

A width Ls of the gap 13 is preferably 0.5 to 3 times the pitch P1 between the outer ridges 8. Since the width Ls of the gap 13 is not less than 0.5 times the pitch P1 between the outer ridges 8, the existence of the gap 13 is sufficiently recognized, and the pattern portion 5 can be made conspicuous. Since the width Ls of the gap 13 is not greater than 3 times the pitch P1 between the outer ridges 8, the size of the gap 13 is inhibited from increasing, and the camouflaging effect for the molding defect can be maintained high. In order to effectively exhibit such an effect, the width Ls of the gap 13 is preferably not less than 0.8 times the pitch P1 between the outer ridges 8, and preferably not greater than twice the pitch P1 between the outer ridges 8. In the present embodiment, the width Ls of the gap 13 is equal to the pitch P1 between the outer ridges 8.

In the present embodiment, the outer ridges 8 include outer main ridges 14 connecting with the tire circumferential line Y and outer sub-ridges 15 connecting with the outer rib 10. One ends 14i and 15i of the outer main ridge 14 and the outer sub-ridge 15 are disposed on the imaginary outer line 8s.

In the present embodiment, the inner ridges 9 include inner main ridges 16 connecting with the tire circumferential line Y and inner sub-ridges 17 connecting with the inner rib 11. One ends 16i and 17i of the inner main ridge 16 and the inner sub-ridge 17 are disposed on the imaginary inner line 9s.

In the present embodiment, the outer sub-ridge 15 is disposed so as to be farther from the first point A than the outer maximum ridge 8x is. In the present embodiment, the inner sub-ridge 17 is disposed so as to be farther from the second point B than the inner maximum ridge 9x is. The outer pattern 6 and the inner pattern 7 having such structures allow the pattern portion 5 to enhance visibility and become conspicuous.

Figure 5:
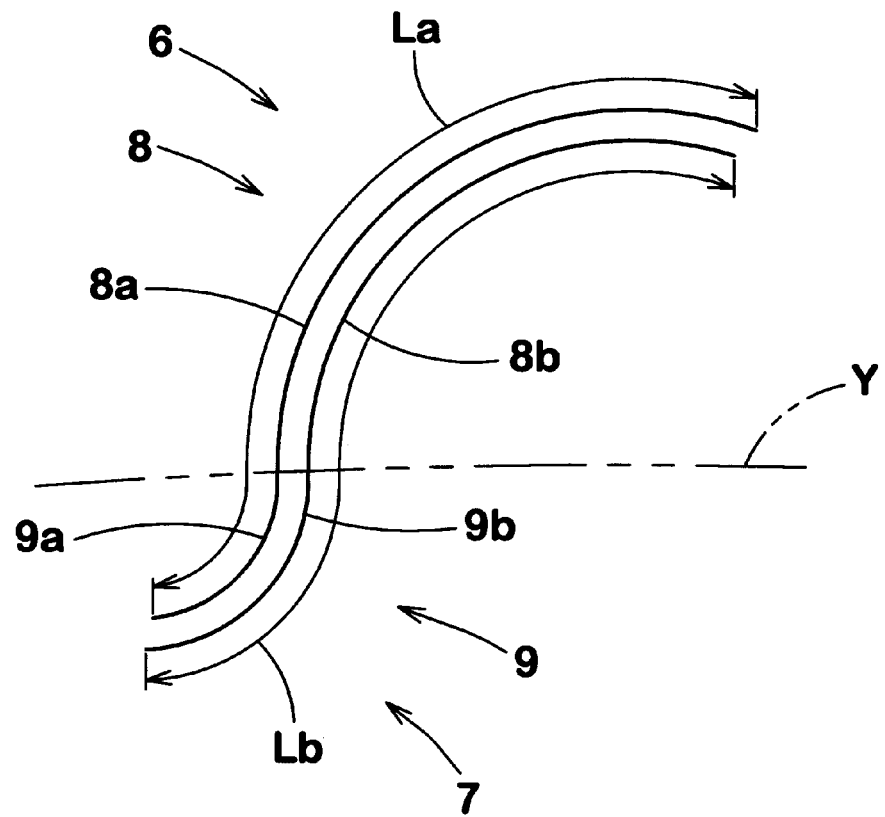
FIG. 5 is a front view of outer ridges and inner ridges according to the present embodiment.

FIG. 5 is a partially enlarged view of the outer ridges 8 and the inner ridges 9 in FIG. 4. As shown in FIG. 5, a total length La of a length of an inner ridge 9a and a length of an outer ridge 8a connecting with the inner ridge 9a is preferably 0.9 to 1.1 times a total length Lb of a length of an inner ridge 9b adjacent to the inner ridge 9a and a length of an outer ridge 8b connecting with the inner ridge 9b. The pattern portion 5 thus formed is visible in a neat manner, and the outer appearance is improved.

Figure 6:
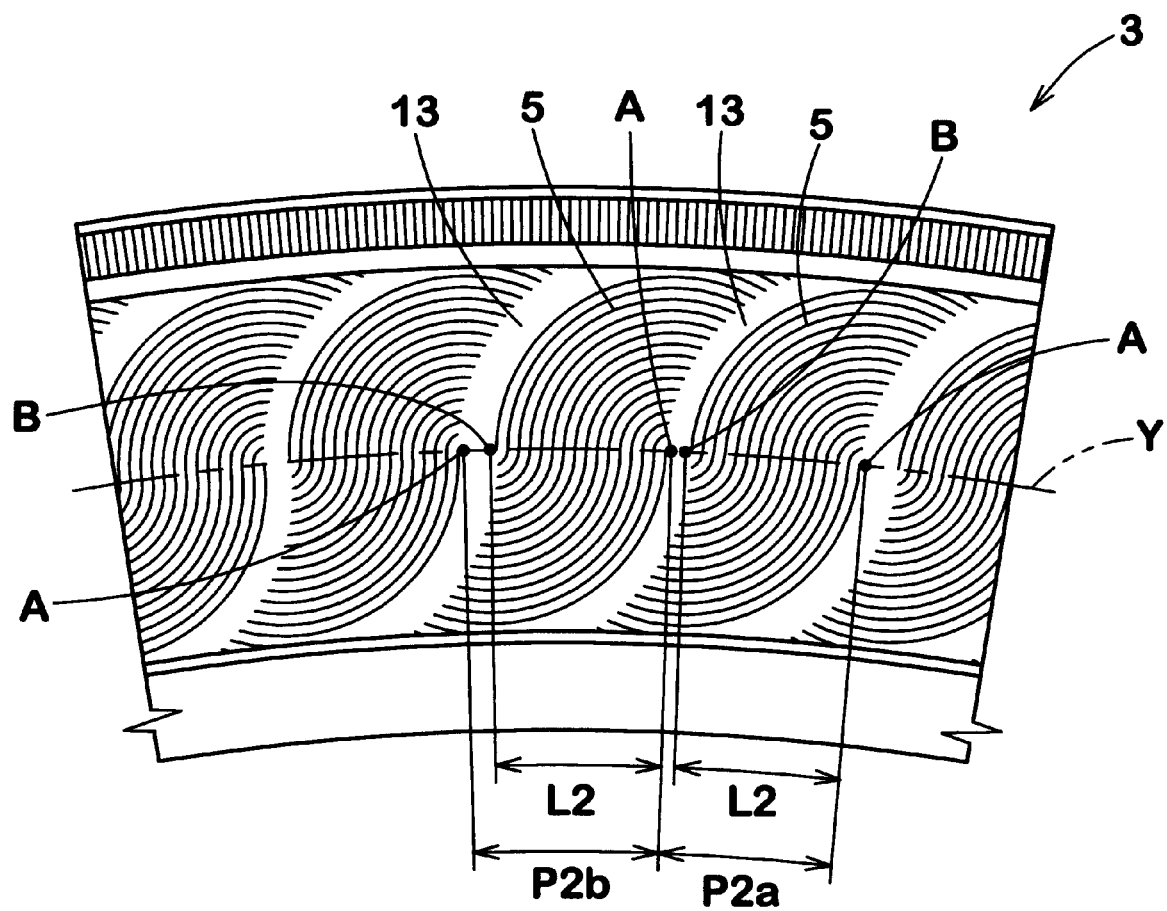
FIG. 6 is a front view of a sidewall portion according to another embodiment.

FIG. 6 is a front view of a sidewall portion 3 according to another embodiment. The same components as those of the sidewall portion 3 of the above-described embodiment are denoted by the same reference numerals and the description thereof is omitted. As shown in FIG. 6, the pattern portions 5 of the present embodiment are disposed at different pitches P2a and P2b in the tire circumferential direction. In the present embodiment, the pattern portions 5 are disposed, for example, such that the first point A and the second point B do not overlap each other on the tire circumferential line Y. Thus, contrast generated by the gaps 13 varies, and the pattern portion 5 enhances visibility. In the present embodiment, a distance L2 between the first point A and the second point B is constant among the pattern portions 5.

Figure 7:
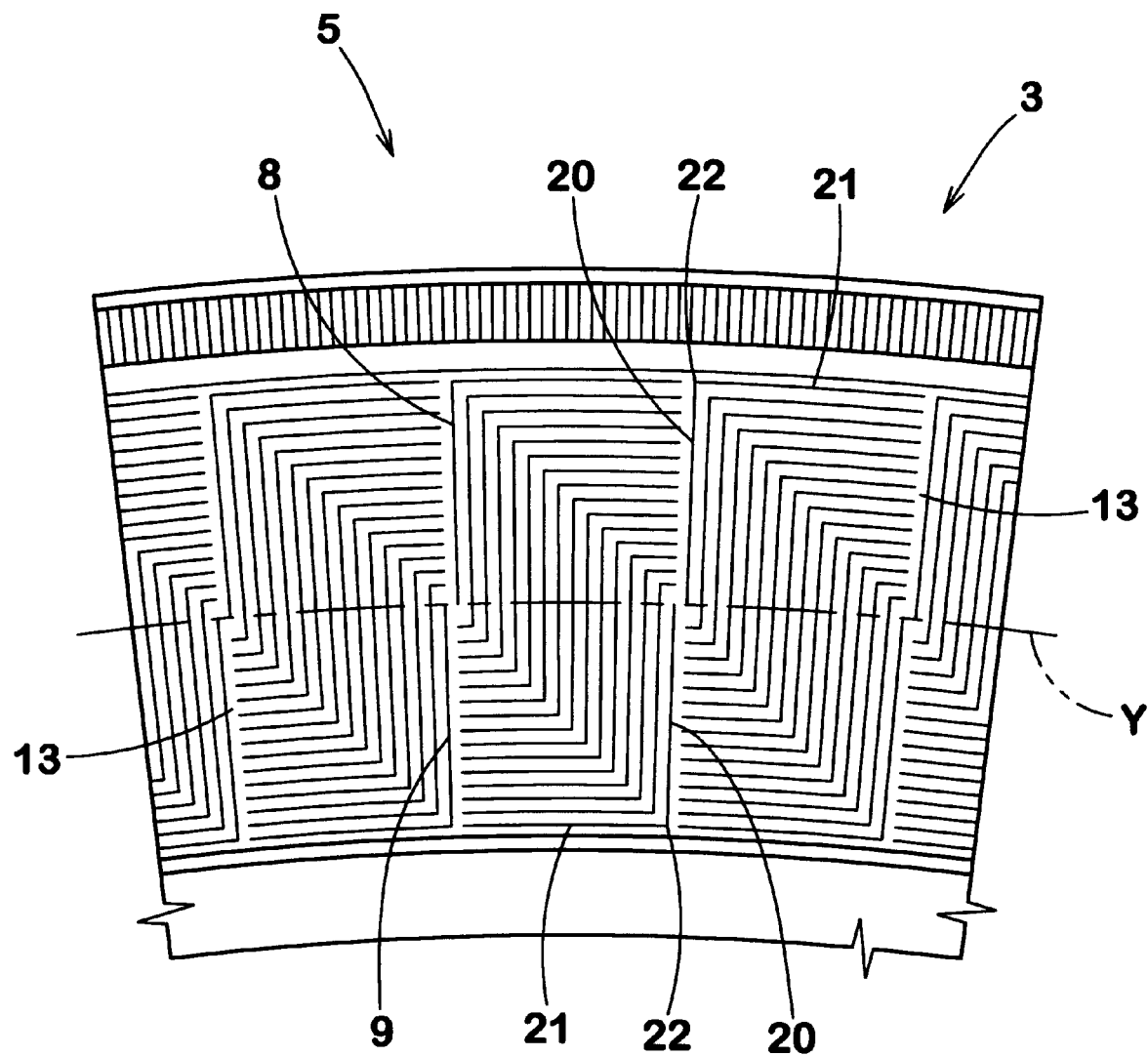
FIG. 7 is a front view of a sidewall portion according to still another embodiment.

FIG. 7 is a front view of a sidewall portion 3 according to still another embodiment. The same components as those of the sidewall portion 3 of the above-described embodiment are denoted by the same reference numerals and the description thereof is omitted. As shown in FIG. 7, in the pattern portion 5 of the present embodiment, each of the outer ridges 8 and each of the inner ridges 9 are bent. Each of the outer ridge 8 and the inner ridge 9 includes a first portion 20 extending from the tire circumferential line Y in the tire radial direction, a second portion 21 extending in the tire circumferential direction, and a bent portion 22 that is bent so as to connect between the first portion 20 and the second portion 21. For example, the first portion 20 and the second portion 21 linearly extend. In the present embodiment, the first portion 20 and the second portion 21 have the same length.

Figure 8:
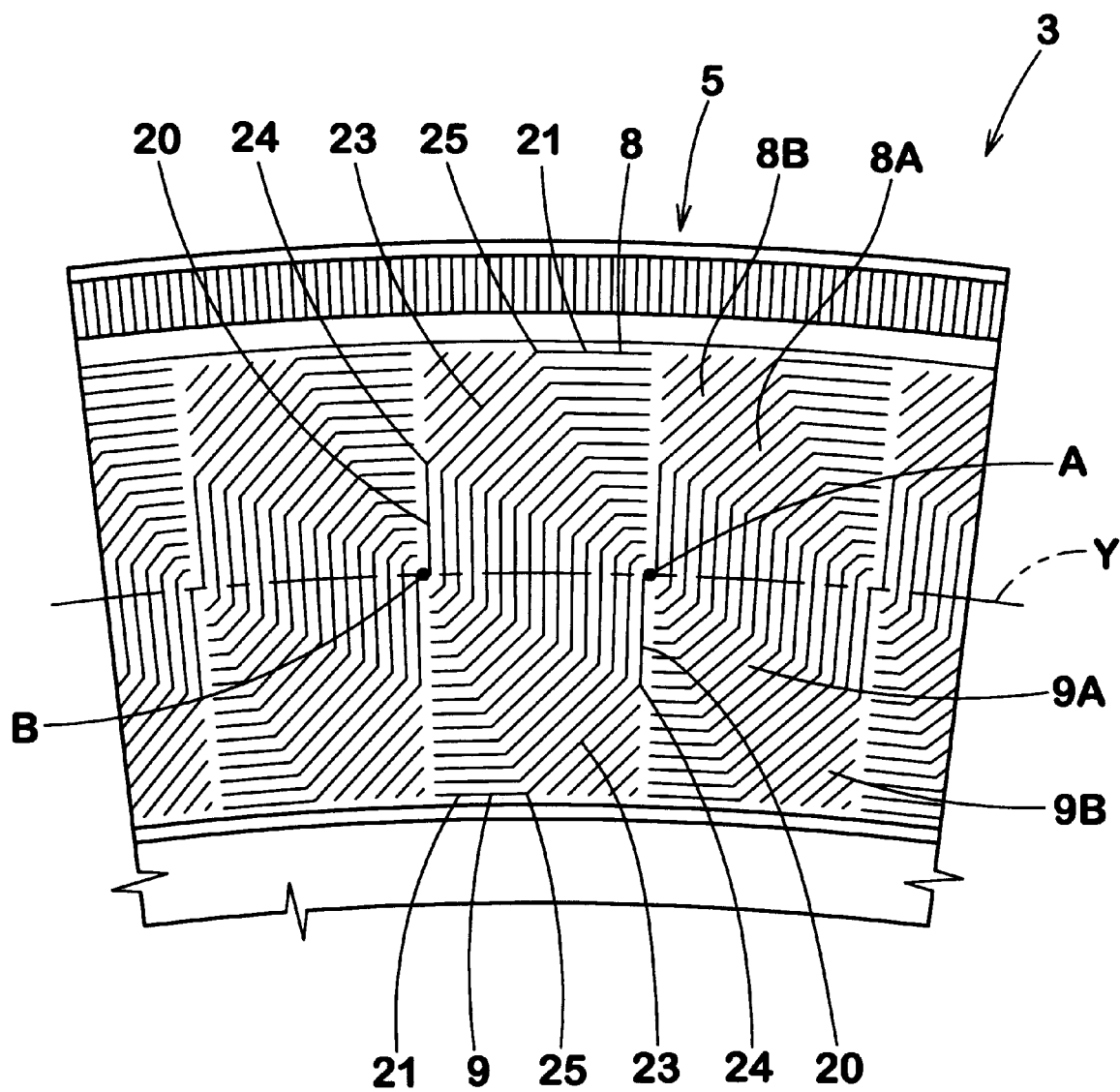
FIG. 8 is a front view of a sidewall portion according to still another embodiment.

FIG. 8 is a front view of a sidewall portion 3 according to still another embodiment. The same components as those of the sidewall portion 3 of the above-described embodiment are denoted by the same reference numerals and the description thereof is omitted. As shown in FIG. 8, in the pattern portion 5 of the present embodiment, the outer ridges 8 and the inner ridges 9 include bent ridges 8A and 9A, respectively, extending so as to be bent, and linear ridges 8B and 9B, respectively, extending linearly. In the present embodiment, each of the bent ridges 8A and 9A includes a first portion 20, a second portion 21, a third portion 23, a first bent portion 24, and a second bent portion 25. For example, the third portion 23 extends linearly so as to be inclined relative to the tire radial direction. For example, the first bent portion 24 is bent so as to connect between the first portion 20 and the third portion 23. For example, the second bent portion 25 is bent so as to connect between the second portion 21 and the third portion 23.

In the present embodiment, the linear ridges 8B and 9B are inclined relative to the tire radial direction. For example, the linear ridges 8B and 9B extend parallel to the third portion 23. In the present embodiment, the linear ridge 8B is disposed so as to be farther from the first point A than the bent ridge 8A is. In the present embodiment, the linear ridge 9B is disposed so as to be farther from the second point B than the bent ridge 9A is.

Figure 9:
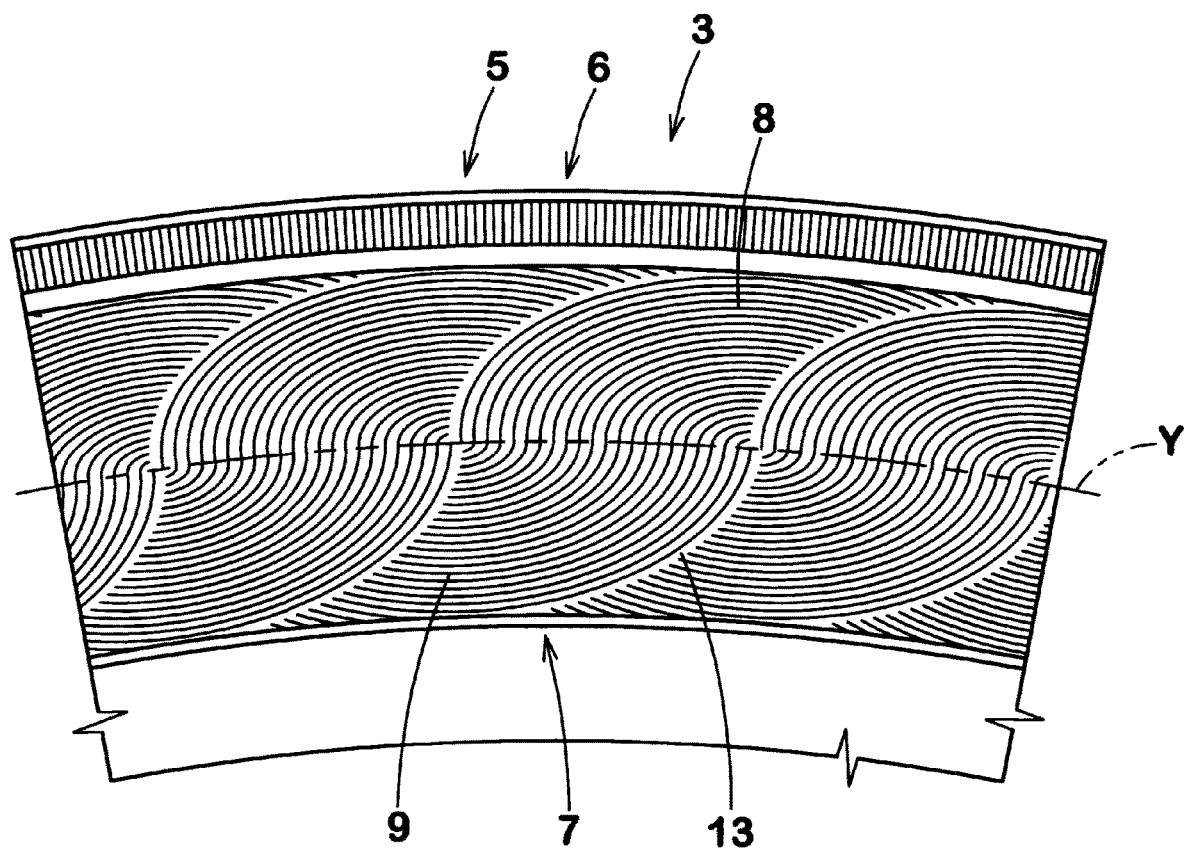
FIG. 9 is a front view of a sidewall portion according to still another embodiment.

FIG. 9 is a front view of a sidewall portion 3 according to still another embodiment. The same components as those of the sidewall portion 3 of the above-described embodiment are denoted by the same reference numerals and the description thereof is omitted. As shown in FIG. 9, in the pattern portion 5 of the present embodiment, each of the outer ridge 8 and the inner ridge 9 extends so as to form an arc-like shape. For example, each of the outer ridge 8 and the inner ridge 9 is formed into a ¼ ellipsoidal shape obtained by cutting an ellipse at the major axis and the minor axis.

Although the particularly preferred embodiments of the present invention have been described above in detail, the present invention is not limited to the embodiments shown in the drawings, and various modifications can be made to practice the present invention.

EXAMPLES

Samples of pneumatic tires each having a pattern portion as shown in FIG. 2 on the surface of a sidewall portion were produced according to the specifications indicated in Table 1. Each test tire was tested for the outer appearance. The pattern portion 5 of comparative example 1 was formed such that the outer ridges 8 and the inner ridges 9 linearly extended so as to be inclined relative to the tire radial direction. In comparative example 1, the outer ridge 8 and the inner ridge 9 connected with each other on the tire circumferential line Y.

Tire size: 185/60R15
Width w1: 0.5 mm
Projecting height h1: 0.3 mm
Pitch P1: 1.0 mm
L1: 33 mm
Tire circumferential line Y: intermediate position of the pattern portion in the tire radial direction <Outer Appearance>

10 inspectors visually checked each sample tire from the side portion that was distant from the tire by 1 m, and tested the sample tire for a degree of conspicuity (visibility) of the pattern portion, and the camouflaging effect for recesses and projections in a molding defect. The visibility was evaluated in a five-point method by setting point 3 as the reference. The greater the value is, the better the evaluation is. The camouflaging effect was evaluated in a five-point method as follows. The results are indicated in Table 1.

Point 5: It was difficult to observe visually or by contact whether or not a recess or a projection was present.
Point 4: It was difficult to visually observe whether or not a recess or a projection was present.
Point 3: It was possible to visually observe whether or not a recess or a projection was present but the recess or the projection was not so conspicuous
Point 2: It was easy to visually observe whether or not a recess or a projection was present.
Point 1: A recess or a projection was very conspicuous and improvement was necessary.
Recess: The depth was about 0.5 mm and the diameter was about 3 mm
Projection: The height of the projection was about 0.5 mm and the diameter was about 3 mm.

The number of the recesses and the number of the projections were equal to each other in any of the test tires.

In Table 1, "connecting" in "connection between outer ridge and inner ridge on tire circumferential line" indicates that each outer ridge and a corresponding one of the inner ridges excluding the outer maximum ridge and the inner maximum ridge connected with each other.

TABLE 1

Figure 10:
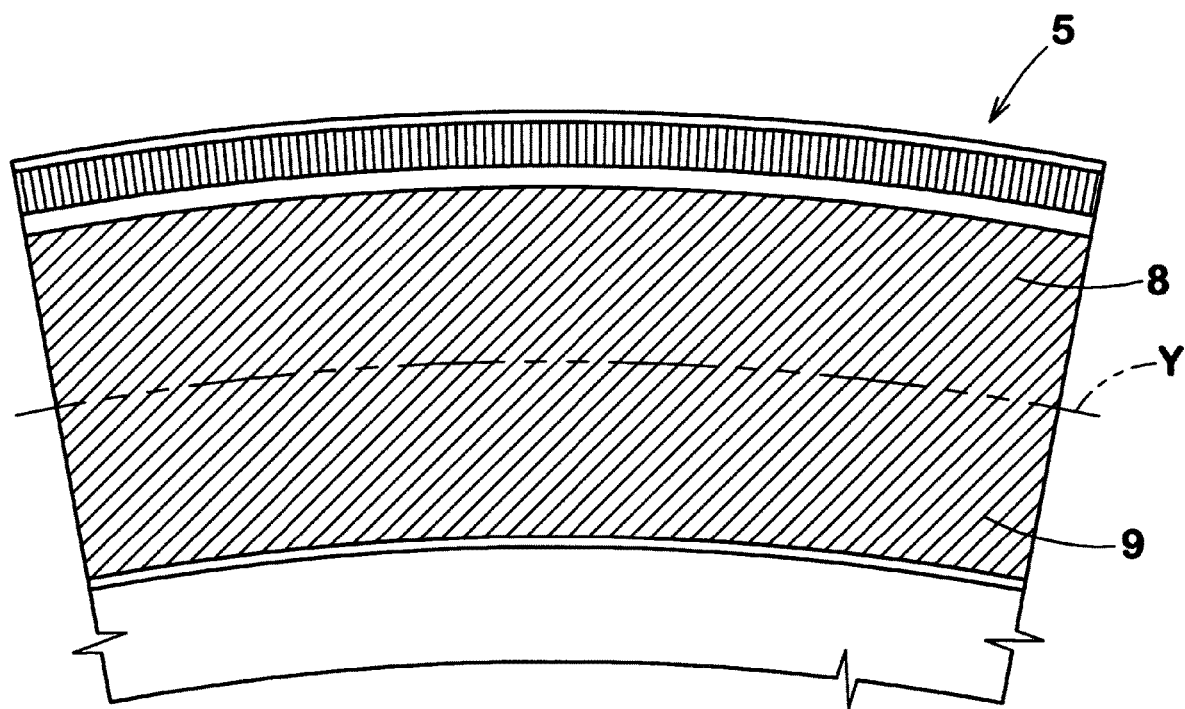
FIG. 10 is a front view of a sidewall portion according to comparative example 1.

| | Comp. Ex. 1 | Ex. 1 | Ex. 2 | Ex. 3 | Ex. 4 | Ex. 5 |
|---|---|---|---|---|---|---|
| Connection between outer ridge and inner ridge on tire circumferential line | connecting | connecting | connecting | connecting | connecting | connecting |
| Pitch between pattern portions | regular pitches | regular pitches | irregular pitches | regular pitches | regular pitches | regular pitches |
| Figure indicating shape of pattern portion | FIG. 10 | FIG. 3 | FIG. 6 | FIG. 7 | FIG. 8 | FIG. 9 |
| Visibility [Five-point method: the greater the value is, the better the evaluation is] | 2.5 | 4.5 | 4.0 | 3.8 | 4.1 | 3.8 |
| Camouflaging effect for projection [Five-point method: the greater the value is, the better the evaluation is] | 2.2 | 4.2 | 3.7 | 4.0 | 4.0 | 4.0 |
| Camouflaging effect for recess [Five-point method: the greater the value is, the better the evaluation is] | 2.0 | 4.0 | 3.9 | 3.8 | 3.8 | 3.9 |

The tires of the examples are superior in the outer appearance to the tire of the comparative example.

What is claimed is:

1. A tire comprising a sidewall portion, wherein the sidewall portion has a pattern portion on a surface, wherein the pattern portion comprises an outer pattern formed outwardly of a tire circumferential line passing through the pattern portion, and an inner pattern formed inwardly of the tire circumferential line, wherein the outer pattern comprises a plurality of outer ridges disposed concentrically around a first point on the tire circumferential line on an outer side in a tire radial direction and extending toward a second point, on the tire circumferential line, which is different from the first point, wherein the inner pattern comprises a plurality of inner ridges disposed concentrically around the second point on an inner side in the tire radial direction and extending toward the first point, wherein each of the outer ridges connects with one of the inner ridges on the tire circumferential line, and wherein the outer ridges adjacent to each other in a tire circumferential direction are disposed at regular pitches having a uniform spacing between adjacent outer ridges along an entire length of the outer ridges, and the inner ridges adjacent to each other in the tire circumferential direction are disposed at regular pitches having a uniform spacing between adjacent inner ridges along an entire length of the inner ridges.

2. The tire according to claim 1, wherein the outer ridges have analogous shapes and the inner ridges have analogous shapes.

3. The tire according to claim 1, wherein each of the outer ridges and each of the inner ridges are bent.

4. The tire according to claim 1, wherein each of the outer ridges and each of the inner ridges extend so as to be arc-shaped.

5. The tire according to claim 1, wherein the tire circumferential line passes through positions distant from an intermediate position of the pattern portion in the tire radial direction by 10% or less of a tire-radial length of the pattern portion in a tire radially inward or outward direction.

6. The tire according to claim 5, wherein the tire circumferential line passes through the intermediate position of the pattern portion in the tire radial direction.

7. The tire according to claim 1, wherein the pattern portion comprises a plurality of pattern portions aligned in a tire circumferential direction.

8. The tire according to claim 7, wherein the pattern portions are aligned through a gap having no ridge.

9. The tire according to claim 7, wherein the plurality of pattern portions are disposed at regular pitches in the tire circumferential direction.

10. The tire according to claim 7, wherein the plurality of pattern portions are disposed at different pitches in the tire circumferential direction.

11. The tire according to claim 7,
wherein the outer ridges comprise an outer maximum ridge having a greatest length, and
wherein, when the outer pattern has an imaginary outer line having a shape analogous to a shape of each outer ridge in a portion farther from the first point than the outer maximum ridge is,
the outer ridges of another outer pattern disposed adjacent to the outer pattern on the imaginary outer line side extend to and terminate on the imaginary outer line.

12. The tire according to claim 7,
wherein the inner ridges comprise an inner maximum ridge having a greatest length, and
wherein, when the inner pattern has an imaginary inner line having a shape analogous to a shape of each inner ridge in a portion farther from the second point than the inner maximum ridge is,
the inner ridges of another inner pattern disposed adjacent to the inner pattern on the imaginary inner line side extend to and terminate on the imaginary inner line.

13. The tire according to claim 1, wherein a total length of a length of each inner ridge and a length of one of the outer ridges connecting with said each inner ridge is 0.9 to 1.1 times a total length of a length of one of the inner ridges adjacent to said each inner ridge and a length of one of the outer ridges connecting with the one of the inner ridges adjacent to said each inner ridge.

14. A tire comprising a sidewall portion, wherein the sidewall portion has a plurality of pattern portions on a surface and aligned in a tire circumferential direction, wherein each pattern portion comprises an outer pattern formed outwardly of a tire circumferential line passing through the pattern portion, and an inner pattern formed inwardly of the tire circumferential line, wherein the outer pattern comprises a plurality of outer ridges disposed concentrically around a first point on the tire circumferential line on an outer side in a tire radial direction and extending toward a second point, on the tire circumferential line, which is different from the first point, wherein the inner pattern comprises a plurality of inner ridges disposed concentrically around the second point on an inner side in the tire radial direction and extending toward the first point, and wherein each of the outer ridges connects with one of the inner ridges on the tire circumferential line, wherein the outer ridges have analogous shapes and the inner ridges have analogous shapes, wherein each of the outer ridges and each of the inner ridges extend so as to be arc-shaped with each of the outer ridges and each of the inner ridges having a respective single radius of curvature, wherein the tire circumferential line passes through positions distant from an intermediate position of the pattern portion in the tire radial direction by 10% or less of a tire-radial length of the pattern portion in a tire radially inward or outward direction, wherein the outer ridges adjacent to each other in a tire circumferential direction are disposed at regular pitches having a uniform spacing between adjacent outer ridges along an entire length of the outer ridges and the inner ridges adjacent to each other in the tire circumferential direction are disposed at regular pitches having a uniform spacing between adjacent inner ridges along an entire length of the inner ridges.

15. The tire according to claim 14, wherein the pattern portions are aligned through a gap having no ridge,
wherein a width of the gap is 0.5 to 3 times a pitch between the outer ridges.

16. The tire according to claim 14, wherein the pattern portions are disposed at different pitches in the tire circumferential direction.

17. The tire according to claim 14,
wherein the outer ridges comprise an outer maximum ridge having a greatest length, and
wherein, when the outer pattern has an imaginary outer line having a shape analogous to a shape of each outer ridge in a portion farther from the second point than the outer maximum ridge is,
the outer ridges of another outer pattern disposed adjacent to the outer pattern on the imaginary outer line side extend to and terminate on the imaginary outer line.

18. The tire according to claim 17,
wherein the inner ridges comprise an inner maximum ridge having a greatest length, and wherein, when the inner pattern has an imaginary inner line having a shape analogous to a shape of each inner ridge in a portion farther from the second point than the inner maximum ridge is, the inner ridges of another inner pattern disposed adjacent to the inner pattern on the imaginary inner line side extend to and terminate on the imaginary inner line.

19. A tire comprising a sidewall portion, wherein the sidewall portion has a pattern portion on a surface, wherein the pattern portion comprises an outer pattern formed outwardly of a tire circumferential line passing through the pattern portion, and an inner pattern formed inwardly of the tire circumferential line, wherein the outer pattern consists of a plurality of outer ridges disposed concentrically around a first point on the tire circumferential line on an outer side in a tire radial direction and extending toward a second point, on the tire circumferential line, which is different from the first point, wherein the inner pattern consists of a plurality of inner ridges disposed concentrically around the second point on an inner side in the tire radial direction and extending toward the first point, and wherein each of the outer ridges connects with one of the inner ridges on the tire circumferential line.

20. A tire comprising a sidewall portion, wherein the sidewall portion has a plurality of pattern portions on a surface and aligned in a tire circumferential direction, wherein each pattern portion comprises an outer pattern formed outwardly of a tire circumferential line passing through the pattern portion, and an inner pattern formed inwardly of the tire circumferential line, wherein the outer pattern comprises a plurality of outer ridges disposed concentrically around a first point on the tire circumferential line on an outer side in a tire radial direction and extending toward a second point, on the tire circumferential line, which is different from the first point, wherein the inner pattern comprises a plurality of inner ridges disposed concentrically around the second point on an inner side in the tire radial direction and extending toward the first point, and wherein a first end of each of the outer ridges of a respective pattern potion connects with a first end of one of the inner ridges of the respective pattern potion on the tire circumferential line so as to have an inflection point on the tire circumferential line, a second end of each of the outer ridges terminates near a first adjacent pattern portion arranged adjacent to the respective pattern portion in a first tire circumferential direction, and a second end of each of the inner ridges terminates near a second adjacent pattern portion arranged adjacent to the respective pattern portion in a second tire circumferential direction.

\* \* \* \* \*